United States Patent [19]

Rudy

[11] 4,062,767
[45] Dec. 13, 1977

[54] MATERIAL HANDLING SYSTEM

[75] Inventor: Samuel Rudy, Tucson, Ariz.

[73] Assignee: Occidental Research Corporation, Los Angeles, Calif.

[21] Appl. No.: 728,220

[22] Filed: Sept. 30, 1976

Related U.S. Application Data

[63] Continuation-in-part of Ser. No. 587,274, June 16, 1975, abandoned.

[51] Int. Cl.² ............................................. B03C 1/02
[52] U.S. Cl. ................................. 209/212; 209/227; 310/13
[58] Field of Search ............... 209/81 R, 81 A, 111.8, 209/212, 213, 214, 215, 223 R, 225, 226, 227; 318/130, 156; 361/156; 310/13

[56] References Cited

U.S. PATENT DOCUMENTS

| 3,111,484 | 11/1963 | Cavanagh | 209/227 |
| 3,328,656 | 6/1967 | Dotson | 318/130 X |
| 3,448,857 | 6/1969 | Benson et al. | 209/212 |
| 3,824,516 | 7/1974 | Benowitz | 209/212 X |

*Primary Examiner*—Robert B. Reeves
*Assistant Examiner*—Joseph J. Rolla
*Attorney, Agent, or Firm*—Harris, Kern, Wallen & Tinsley

[57] ABSTRACT

A system for separating electrical conducting components from mixtures such as scrap and trash, particularly aluminum, copper and stainless steel materials, since magnetic materials are readily removed by simple magnets. A polyphase induction motor connected with capacitors for each phase for continuous operation under resonant conditions. A conveyor system for moving the mixture across the motor along a path perpendicular or oblique to the axis of the motor, with the motor intermittently loaded to move the randomly arriving electrical conducting components out of the remainder of the mixture.

6 Claims, 12 Drawing Figures

MATERIAL HANDLING SYSTEM

This application is a continuation-in-part of copending application Ser. No. 587,274, filed June 16, 1975, now abandoned.

This invention relates to material separators utilizing linear induction motors, and in particular to a new and improved material handling system incorporating a linear polyphase induction motor.

Uncontrolled mixtures of materials must be handled and disposed of in todays world. Typical of these mixtures are municipal trash and refuse, shredded mterials from old automobiles, and manufacturing scrap.

Mixtures as collected today contain a variety of materials, including magnetic material, electrical conductive material, and organic material. It is often desirable to separate the magnetic material and the electrical conducting material from the organic material for separate handling and for salvage purposes. It is relatively easy to separate magnetic material by use of electro-magnets. A copending application Ser. No. 450,007, filed Mar. 11, 1974, now abandond, and its continuations Ser. No. 560,193, filed Mar. 21, 1975, now abandoned, and Ser. No. 649,785, filed Jan. 16, 1976, and assigned to the same assignee as the present application, disclose the basic concept of utilizing a three phase linear induction motor for separating electrical conducting material from mixtures. The motor produces a travelling wave along the axis of the motor, with the resulting magnetic field being useable for induction motor applications. The mixture is moved across the pole faces of the motor along a path generally perpendicular to the axis of the motor and the electrical conducting components, such as aluminum and copper materials, are moved by the motor action away from the conveyor.

While this prior art system operates satisfactorily, it has certain disadvantages, primarily resulting from the intermittent nature of the operation of the system. Many of the components of the mixture may be relatively small compared to the motor size and the electrical conducting components appear randomly in the mixture as it passes the motor, with the result that the motor is loaded only intermittently and has a relatively low average load while at the same time requiring a relatively high peak output. This results in a high kva requirement for the power supply, a high initial cost for the equipment and a high power consumption.

One approach to improving the operation is set out in copending application Ser. No. 480,713, filed June 19, 1974, now U.S. Pat. No. 3,950,661, and assigned to the same assignee as the present application. This patent discloses a single phase linear induction motor connected as an aritificial transmission line.

It is an object of the present invention to provide a new and improved mixture handling system incorporating a polyphase linear induction motor having a reduced kva requirement, and incorporating energy storage for handling the randomly coupled loads in the form of an electrical conducting material in the mixture, and utilizing a continuously excited motor eliminating switching and timing requirements. A further object is to provide such a system which can utilize a conventional polyphase linear induction motor, typically a two-phase or three-phase motor.

The objects of the invention are achieved by connecting each phase of the linear motor in a resonant circuit. The resonant circuit provides energy storage for pulse type output when an electrical conducting component is moved into the motor's field, while reducing energy consumption during quiescent times of motor operation. The apparent power requirement for the motor with resonant circuit is substantially less than for the conventional motor, with a resultant substantial decrease in kva rating. Hence the cost of the equipment and the electric utilities charge for cost of operation are reduced. Further, with the random loading of the motor, the motor design can be optimized for the non-loaded Q condition, since no armature or similar structure is utilized.

The system can handle a mixture of non-responsive and responsive materials. The responsive materials are non-magnetic electrical conducting metals. The non-responsive materials include all non-metallic materials and non-magnetic metals which are less conductive than those metals that are responsive materials. Such metals include lead, 316 stainless steel, nickel coin alloy (30% copper and 70% nickel), and the like. By the term responsive material, it is meant material that will respond to a traveling electromagntic wave produced by the linear motor described and claimed in this application.

Other objects, advantages, features and results will more fully appear in the course of the following description. The drawings merely show and the description merely describes preferred embodiments of the present invention which are given by way of illustration or example.

Figure 1:
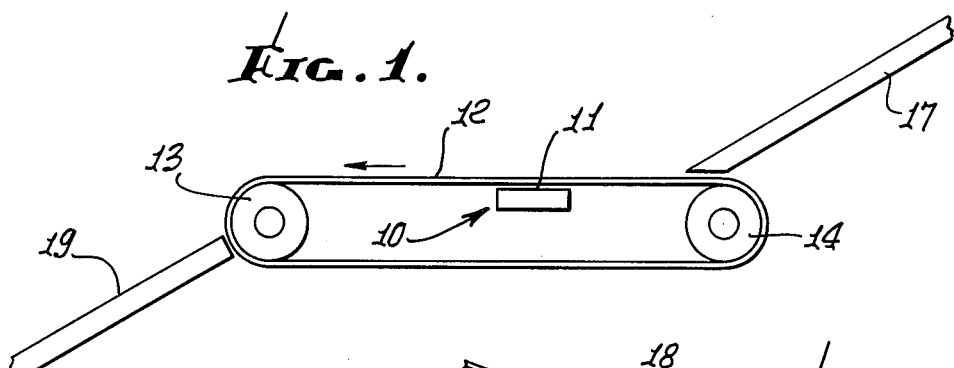
FIG. 1 is a side view of a separation system incorporating the presently preferred embodiment of the invention.
Figure 2:
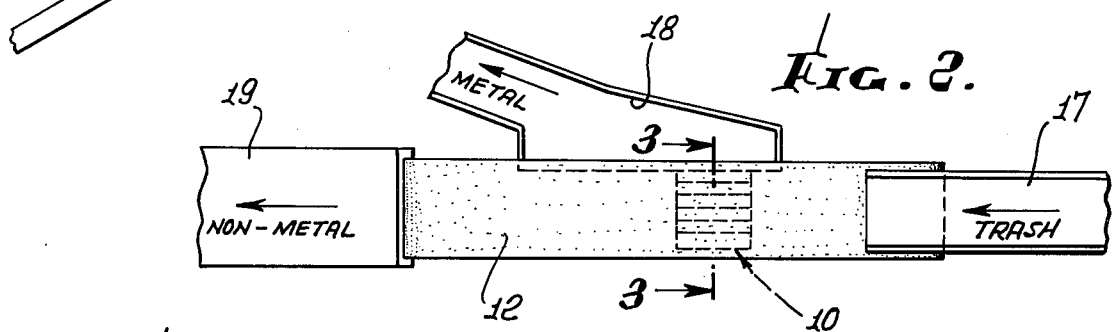
FIG. 2 is a top view of the system of FIG. 1.

The separation system of FIGS. 1 and 2 includes a linear motor 10 and means for moving the mixture across the pole faces 11 of the motor. Typically a conveyor, such as an endless belt 12 driven on rolls 13, 14 provides the means for moving the mixture. The mixture may be delivered to the belt 12 upstream to the motor 10 by a chute or conveyor 17. The motor 10 functions to move the electrical conducting components of the mixture to the side of the belt 12, as into another chute or conveyor 18. The material not moved by the motor is deposited into another chute or conveyor 19 by the belt 12. Ordinarily, the magentic materials will be separated from the mixture in the conventional manner by simple magnets upstream of the linear motor separation system. The linear motor funcions to remove materials such as aluminum, copper, stainless steel and the like. A number of alternative configurations for the separation system are shown in the copending application Ser. No. 450,007.

Figure 3:
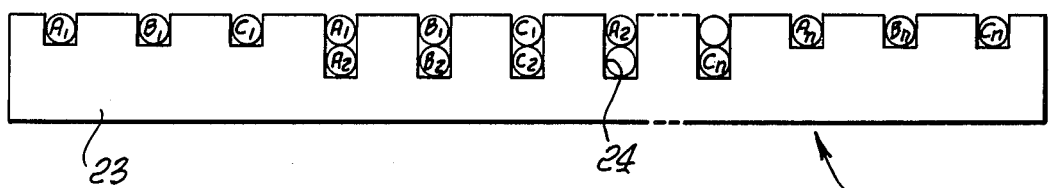
FIG. 3 is an enlarged sectional view of the linear motor taken along the line 3—3 of FIG. 2.
Figure 4:
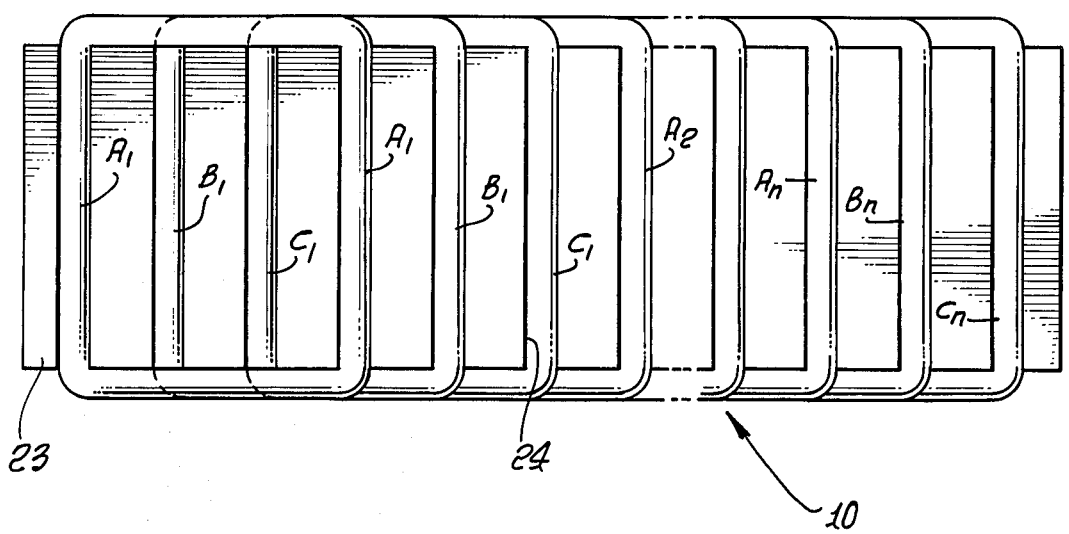
FIG. 4 is a top view of the motor of FIG. 3.

The polyphase linear motor as shown in FIGS. 3 and 4 may be conventional in construction, and a 3 phase motor is illustrated. A core 23 is formed of a plurality of laminations of ferrous material held together by bonding or riveting or the like. A winding in the form of a plurality of coils is positioned in the slots 24 of the core. In the 3 phase winding illustrated, the A phase coils are identified as A1-An, the B phase coils as B1-Bn and the C phase coils as C1-Cn.

Figure 5:
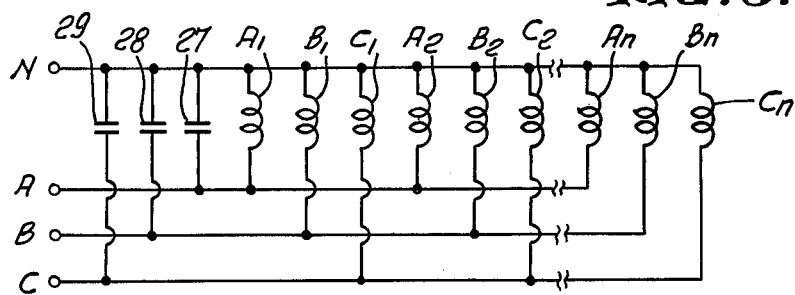
FIG. 5 is an electrical diagram illustrating the connection of the motor of FIG. 3 in a 3 phase delta parallel resonant configuration.
Figure 6:
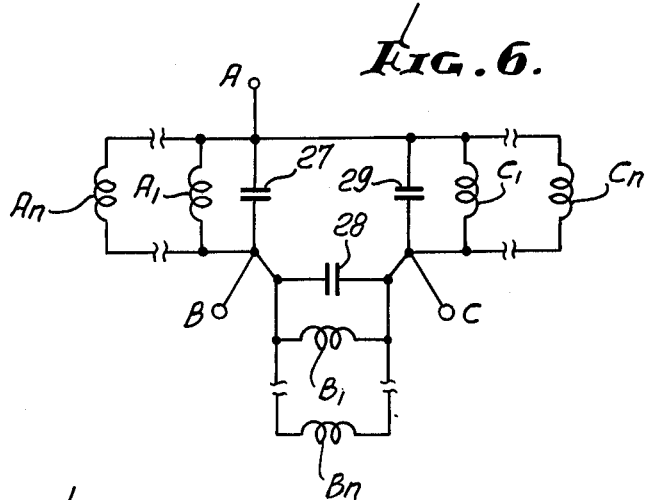
FIG. 6 is an electrical schematic showing a 3 phase wye parallel resonant configuration.
Figure 8:
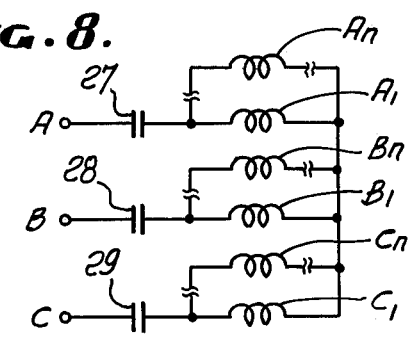
FIG. 8 is an electrical schematic showing a 3 phase wye series resonant configuration.
Figure 9:
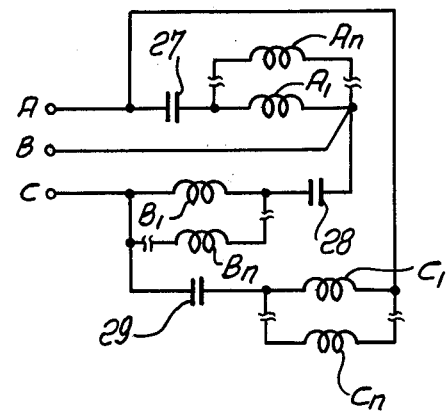
FIG. 9 is an electrical schematic showing a 3 phase delta series resonant configuration.

FIG. 5 illustrates a 3 phase delta connection induction motor. A capacitor 27 is connected in parallel with the coils A1-An to provide a parallel resonant circuit. Similar capacitors 28, 29 are connected in parallel with the B phase and C phase coils, respectively. A wye connected motor with parallel resonant circuits is illustrated in FIG. 6. A wye connected motor with series resonant capacitors for each set of coils is illustrated in FIG. 8, and a delta connected series resonant circuit is illustrated in FIG. 9. Three wire systems are shown in FIGS. 5, 6, 8 and 9, however, six wire systems can be used if desired, maintining the three phases separate.

Figure 7:
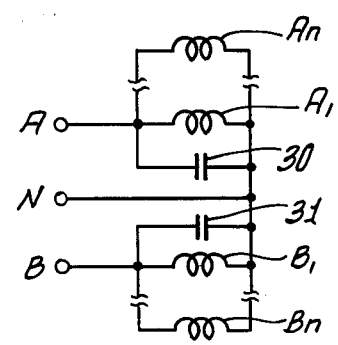
FIG. 7 is an electrical schematic showing a 2 phase parallel resonant configuration.
Figure 10:
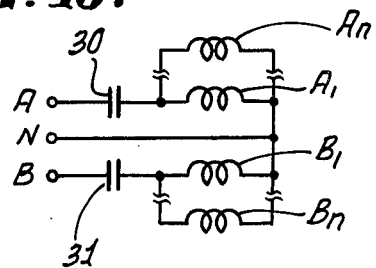
FIG. 10 is an electrical schematic showing a 2 phase series resonant configuration.

Corresponding connection configurations for 2 phase motors are shown in FIGS. 7 and 10, with FIG. 7 having a capacitor 30 connected in parallel with the A phase coils A1-An and a capacitor 31 connected in parallel with the B phase coils B1-Bn, and with the capacitors connected in a series resonant configuration in FIG. 10. FIGS. 7 and 10 show three wire systems with a common netural, however, four wire systems can be utilized with the A and B phases entirely seprate.

Figure 11:
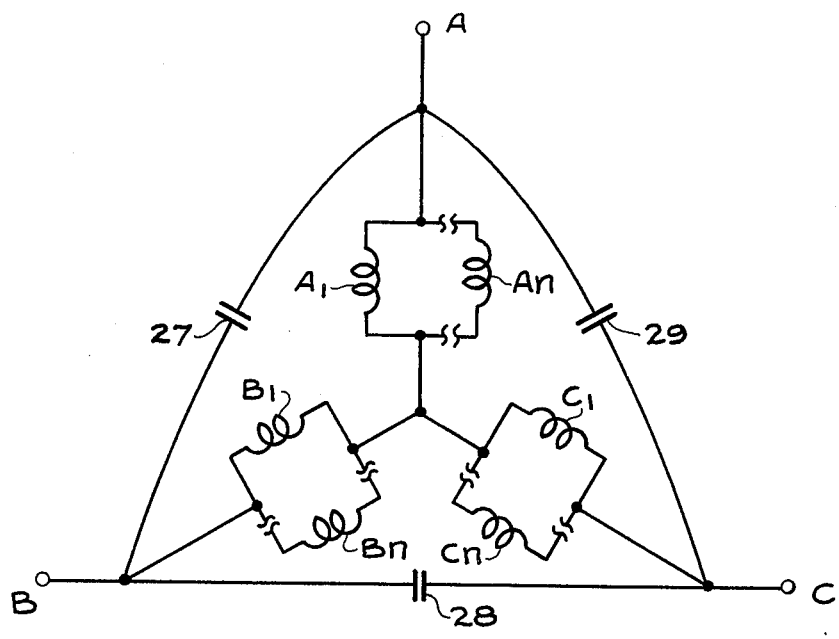
FIG. 11 is an electrical schemtic showing a combination delta-wye configuration.
Figure 12:
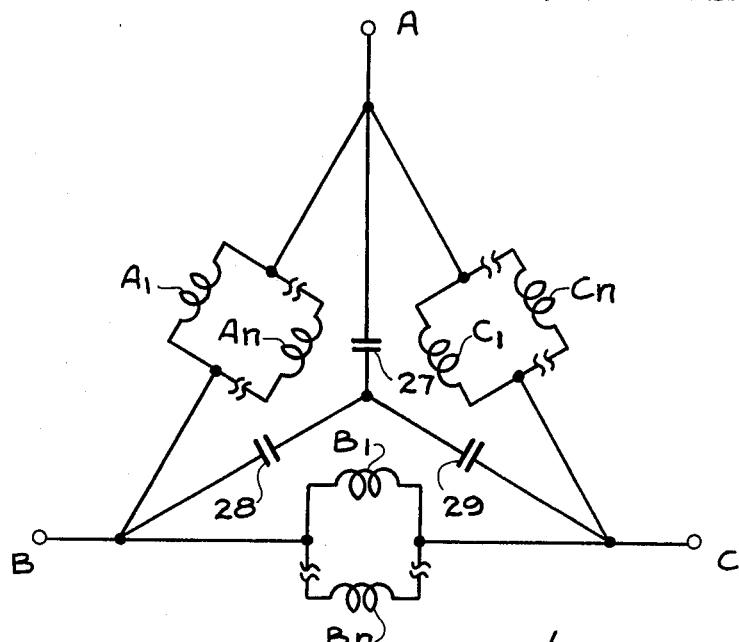
FIG. 12 is an electrical schematic showing a combination wye-delta configuration.

Combination delta and wye connections are shown in FIGS. 11 and 12. In the circuit of FIG. 11, the three coil sets are wye connected and the three capacitors are delta connected. In the configuration of FIG. 12, the three coil sets are delta connected and the three capacitors are wye connected.

The system operates the same for the various connection configurations, with the particular configuration utilized often being controlled by the economics of the installation. FIG. 11 illustrates the presently preferred configuration. Capacitors with a high voltage and low current rating presently are cheaper than capacitors with a low voltage and high current rating. Hence a delta connection is preferred for the capacitors. In the linear motor, the end effects at each end of the motor produce unbalance in the loading of the three phases which results in a circulating current when the coils are delta connected. The circulating current is undesirable and can be avoided by utilizing the wye connection for the coils. The circulating currents do not pose a problem with the capacitors.

Typically, the separation system of the present invention is operated in the frequency range of 400 to 800 hertz and 240–720 volts rms. These ranges have been found particularly suitable for separating aluminum cams, the principal electrical conducting, non-magnetic metal component found in municipal trash. Of course, other frequencies and voltages can be utilized where desired. The capacitance of each capacitor is selected to provide resonance with the coils at the operating frequency, and this may be determined by conventional techniques. While parallel plate capacitors presently are preferred for providing the desired capacitance in the circuit, other forms of capacitor or condenser may be utilized and the word "capacitor" as used herein is intended to include any of the conventional elements which provide capacitance.

The conveyor belt 12 is made of an electrical non-conducting material such as rubber or a similar synthetic material so that it will not function as an armature and will not provide a load on the motor. Then the motor will normally be in the non-loaded condition. Then the dissipation of the motor when continuously energized from the power source is only that of the circuit elements, that is, the resistance of the coils plus the small losses in the capacitors. Under these conditions, the motor has a non-loaded Q which can be controlled to provide optimum operation in mixture separation, where the conducting components are small relative to the motor size and only intermittently load the motor. It has been foundthat the unloaded or non-loaded Q of the motor with the resonant circuitry should be in the range of about 5 to 150, and preferably in the range of about 25 to 50. If the Q is too low, the resonant circuitry has little effect on the operation; if the Q is too high, satisfactory resonant conditions are difficult to obtain because of the narrow band width. It has been found that the presence of aluminum cans and other electrical conducting items in the mixture moving over the motor during separation has little effect on the Q of the system. While resonance theoretically is defined as the condition where the inductance and capacitance are selected to provide zero reactance, as a practical matter a resonant circuit will have a resonance curve with a finite band width and the circuit need not have the capacitive reactance exactly the same as the inductive reactance to obtain the benefits of a resonant condition utilizing capacitance and inductance in combination.

The Q of a device is the ratio of reactance to resistance or the ratio of stored energy to dissipated energy. The non-loaded Q of a system is defined as the value of Q obtained when only the incidental dissipation of the system elements is present. The Q of the motor may be varied by varying the loss generating elements, including core size and shape, core material, coil size and shape, coil wire size, and capacitor quality as well as by varying the operating frequency.

I claim:

1. In a system for handling mixtures having electrical conducting components, the combination of:
   a linear polyphase induction motor having a core with a face and a plurality of coils in substantially parallel slots defining a motor axis perpendicular to said slots, with said coils connected in groups with a group for each phase;
   circuit means for connecting said coil groups to a polyphase AC source for continuous excitation of said motor;
   a plurality of capacitors, with a capacitor for each phase and connected in circuit with said groups of coils to provide a resonant circuit; and
   means for moving a mixture having random electrical conducting components across said motor face along a path not aligned with said motor axis, so that said random components are moved out of the mixture in the direction of said motor axis by coupling of said components to the motor magnetic field, and including
   a conveyor with an electrical non-conducting sheet moving across the face of said motor along said path, with the motor being only intermittently loaded by the random coupling of said conducting components, first means for depositing material on said conveyor upstream of said motor, second means for receiving material from said conveyor down stream of said motor, and third means for receiving conducting components at one side of said conveyor, with said motor on one side only of said conveyor sheet.

2. A system as defined in claim 1 wherein said core, coils and capacitors are selected such that the motor has an unloaded Q in the range of about 5 to 150.

3. A system as defined in claim 1 wherein said core, coils and capacitors are selected such that the motor has an unloaded Q in the range of about 25 to 50.

4. A system as defined in claim 1 wherein said coil groups and said capacitors are connected with the same configuration.

5. A system as defined in claim 1 wherein said coil groups and said capacitors are connected with different configurations.

6. A system as defined in claim 1 wherein said coil groups are connected in one of a delta and wye configuration and said capacitors are connected in the other of said delta and wye configuration.

* * * * *